March 14, 1961 T. J. R. BRIGHT 2,974,383
CLIPS OR TAGS AND DRAUGHT-EXCLUDING
STRIPS, BEADINGS, MOULDINGS OR THE
LIKE FOR USE THEREWITH
Filed Oct. 29, 1956 2 Sheets-Sheet 1
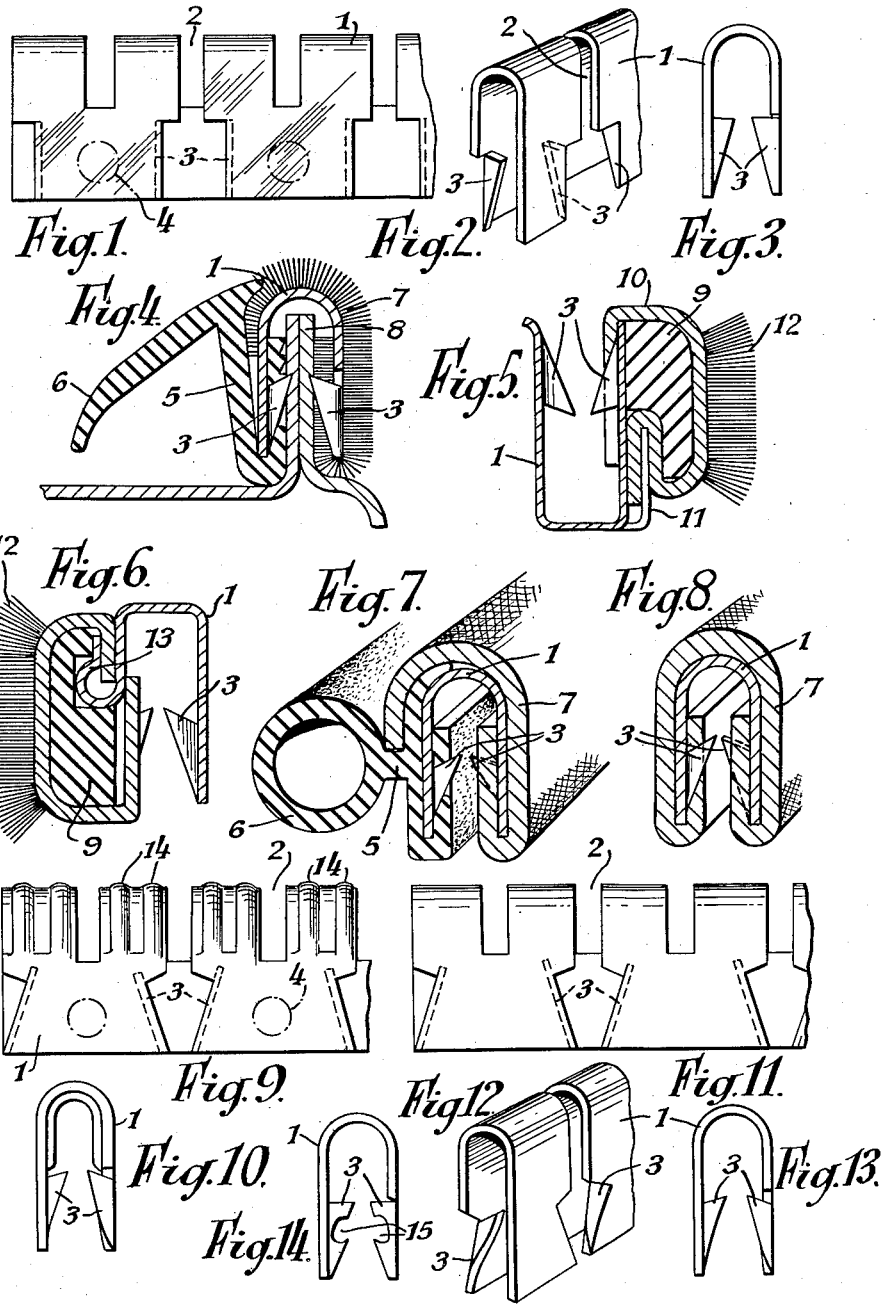
INVENTOR
Thomas John Robert Bright
BY
Stevens, Davis, Miller + Mosher
his ATTORNEYS March 14, 1961 T. J. R. BRIGHT 2,974,383
CLIPS OR TAGS AND DRAUGHT-EXCLUDING
STRIPS, BEADINGS, MOULDINGS OR THE
LIKE FOR USE THEREWITH
Filed Oct. 29, 1956 2 Sheets-Sheet 2
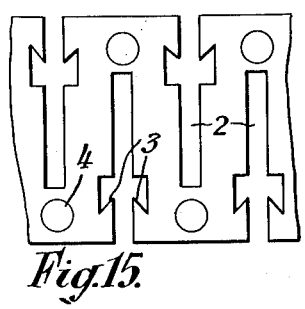
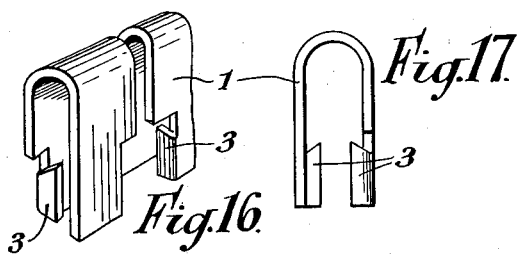
INVENTOR
Thomas John Robert Bright
BY
Stevens, Davis, Miller & Mosher
his ATTORNEYS United States Patent Office 2,974,383
Patented Mar. 14, 1961

2,974,383

CLIPS OR TAGS AND DRAUGHT-EXCLUDING STRIPS, BEADINGS, MOULDINGS OR THE LIKE FOR USE THEREWITH

Thomas John Robert Bright, The Lodge, Leek Wootton, Warwick, England

Filed Oct. 29, 1956, Ser. No. 618,847

3 Claims. (Cl. 24—259)

This invention relates to clips or tags, the words "clips or tags" being intended to cover any component which maintains its position on or in an associated part or parts by virtue of the inherent resiliency of the material from which the component is constructed, the frictional grip on the surface or surfaces of the part or parts being in some cases augmented by forming the component with pressed tangs which frictionally engages the part or parts with which the component is associated. Such clips or tags have many uses too numerous to specify. One of the uses with which the present invention is primarily concerned is in connection with draught-excluding strips, beadings or mouldings such as are commonly used in the motor industry in connection with motor vehicles.

The present invention therefore is not only concerned with clips or tags but is also concerned to a certain extent in evolving an improved form of draught-excluder strip, beading or moulding for use with such clips or tags.

It is the present practice in the construction of motor vehicles to provide a flange around each door opening on to which the draught-excluder strip is secured and the clips or tags forming the subject of the present invention have been designed to straddle this flange and to grip the flange in such a manner, that, although the clips or tags can be easily placed in position, they will nevertheless very effectively prevent their accidental displacement. This result is obtained by the particular form of the tangs which are associated with the clips or tags.

In the construction of clips or tags as hitherto the tangs were merely pressed out of the plane of the clips or tags, and consequently the clips or tags maintained their position on the supporting flange mainly by the inherent resiliency of the tangs which were necessarily of quite small dimensions.

The chief object of the present invention is to evolve various improved forms of clips or tags wherein advantage can be taken of the apparently large size of the clips or tags and their natural inherent resiliency to secure them firmly in position upon a supporting flange or equivalent part.

A clip or tag in accordance with the present invention is bent up from spring steel or other suitable sheet or strip material having a good inherent resiliency, the clip or tag having one or more tangs formed by bending or pressing out the material which is to form the tang, the material being pressed out of the plane of the clip or tag so that the tang provides a comparatively sharp edge or point which will tend to bite into the surface of the flange or equivalent part on which the clip or tag is mounted.

The tangs are preferably so shaped as to be inwardly inclined in the opposite direction to the direction of movement of the clip or tag when it is being placed in position, and this inclined formation of the tangs permits the clip or tag to be easily pressed into position on the flange but effectively resist its removal therefrom.

As previously explained, the present invention is also concerned with the special formation of a draught-excluder strip, beading or moulding for use with such clips or tags, and it is proposed in accordance with the present invention to utilise the tangs for holding the draught-excluder or the like in position upon the clips or tags.

The term "clip" used in this specification is intended to cover a construction wherein the clip is of continuous length, that is to say, it extends throughout the full length of the draught-excluder strip, beading or moulding with which it is associated. On the other hand, the word "tag" is used to define a clip of short length, a large number of such tags being used, suitably spaced apart, throughout the length of the draught-excluder strip or the like with which they are associated, the tags being preferably incorporated into the strip during the strip's manufacture.

Referring to the drawings:

Figure 1 illustrates in side elevation one form of clip constructed in accordance with the present invention;

Figures 2 and 3 represent in perspective and in end elevation the clip illustrated in Figure 1;

Figure 4 discloses a clip substantially as in Figure 1 and carrying a draught-excluder strip, the clip and its associated strip being shown mounted in position upon a supporting flange;

Figure 5 is a similar view but illustrating a modified form of clip and a modified form of draught-excluder or window-sealing strip;

Figures 6 and 7 illustrate two alternative forms of draught-excluding or window-sealing strips and their associated clips, whilst Figure 8 illustrates a beading or moulding which is intended primarily for ornamental purposes;

Figure 9 illustrates a further modified form of clip;

Figure 10 illustrates this modified clip in end elevation;

Figures 11, 12 and 13 illustrate in side elevation, perspective and end elevation a still further modified construction of clip;

Figure 14 is an end elevation illustrating a minor modification;

Figure 15 is a plan view of the blank from which a further modified form of clip is produced;

Figures 16 and 17 illustrate in perspective and end elevation the clip produced with the blank illustrated in Figure 15.

Referring in the first case to Figures 1 to 3 of the drawings, the clip illustrated is bent up from spring steel, aluminium or other material of a resilient nature, the clip being bent into substantially inverted U shape. It is intended that this clip shall be capable of universal bending movement, and consequently the clip 1 is formed throughout its length with a series of spaced, staggered slots 2 which project inwardly from its opposite edges. The limbs of the clip are formed with inwardly pressed parts of substantially triangular shape which, when pressed inwardly, lie at right angles to the plane of each limb and form tangs 3 which are intended to frictionally grip the surfaces of an associated supporting flange or equivalent part on which the clip is mounted. As it is intended that such a clip shall usually be associated with a draught-excluder strip, beading or moulding, the limbs of the clip may be formed with holes 4 so that the strip or the like can be conveniently sewn in position thereon. The strip, beading or moulding, however, may be adhesively secured in position or secured in any other manner desired.

Referring to Figure 4, a suitable form of draught-excluder strip is shown mounted in position upon an associated clip, and in this case the draught-excluder strip 5 is composed of rubber or other mouldable resilient material and includes an effective portion of leaf shape marked 6 and a textile or other covering material generally indicated by reference numeral 7, this covering material having a pile or other suitable decorative surface. It will be seen that the covering material, which may, for example, be first of all stitched to the rubber moulding, extends around the upper part of the clip and down the side of one limb and then upwardly into the interior of the clip. The rubber component also extends into the interior of the clip and it is proposed in this case that the tangs 3, which frictionally engage the surfaces of the supporting flange 8, shall perforate both the covering material and the upwardly projecting inner part of the rubber component so that the tangs 3 perform the dual purpose of securing the clip firmly in position and also holding the covering material and rubber component firmly in position on the clip without the necessity for sewing, adhesive or other securing means.

Referring now to Figure 5, the clip is again of U or channel formation having inwardly-pressed tangs 3, but in this case the strip, which is primarily designed as a window seal, comprises an inner core 9 of sponge rubber or the like and an outer textile covering 10, which again is perforated by one of the tangs 3, to secure it in position. In this case, however, the clip is formed at spaced intervals with a series of pressed-out tongues 11 which grip the opposite edge of the covering material and maintain the latter in position.

In Figure 6, which again is primarily concerned with a window sealing strip, the sealing strip includes a core 9 and covering 10 which, as in the case of Figure 5, may carry a pile or other glass-engaging surface 12. In this case, instead of the clip being formed with tongues 11, it is formed with spaced tongues 13 of a different formation, which tongues grip the upper edge of the covering material, whilst the lower edge of the covering material is held in position by means of one of the inwardly-directed tangs.

Figure 7 illustrates a simple type of draught-excluder strip, wherein the covering 7 and rubber component 5 are sewn together and are ultimately secured on the strip in a similar manner to that illustrated in Figure 4.

In Figure 8 a simple type of beading or moulding of an ornamental character is shown which merely comprises a textile or other form of covering 7 having inwardly and upwardly directed tangs.

In Figure 9 an alternative form of continuous strip is illustrated which differs slightly from that shown in Figures 1 to 3, in that the tangs 3 in this case occupy an inclined position. This formation of the tangs gives each tang a form which is shown more clearly in Figure 10, wherein the point of each tang is in the form of a barb which very materially assists the tangs to bite into the surface of the flange or other support and more effectively resist removal. The clip shown in Figures 9 and 10 may, for example, be constructed from an aluminium alloy which may not have quite the resilience of a clip produced from steel, and consequently it is proposed in this case to corrugate the curved part of the clip as at 14.

In Figures 11, 12 and 13 a clip is illustrated similar to the shown in Figures 9 and 10, except for the fact that the corrugations are omitted, such a clip being, for example, composed of steel or other comparatively springy material.

In Figure 14 a modified form of tang is illustrated, each tang being formed with two gripping surfaces produced by cutting away the central part of the tangs as at 15.

In Figures 15, 16 and 17 a slightly modified form of tang is illustrated as applied to a continuous type of clip. In this case the tangs 3 are of a different shape, that is to say, they each include an effective portion which lies parallel with the surface of the supporting flange so that, instead of each tang making point engagement with the flange, this engagement is a linear engagement. The form which the strip takes prior to the tangs being bent out of its plane and the strip being bent into substantially inverted U shape is clearly illustrated in Figure 15.

I claim:

1. A device of the type used to attach lengths of sealing material to a flange comprising an elongated, continuous channel shaped clip of resilient material having two opposed limbs and a bend, said clip having a plurality of longitudinally spaced slots each extending transversely of the clip for over half of its transverse expanse, said slots alternately originating at the edge of opposite limbs of the clip and having a widened portion adjacent the longitudinal edge at which each slot originates, and said limbs have tangs bent therefrom to define the origin of said slots, said tangs lying in a plane normal to the face of the flange upon which said clips are to be mounted and normal to the longitudinal axis of said clip.

2. An elongated continuous channel clip as claimed in claim 1 in which said tangs are triangular shaped.

3. An elongated continuous channel clip as claimed in claim 2 in which said tangs are in the shape of a triangle of which one of the angles is greater than an acute angle.

References Cited in the file of this patent

UNITED STATES PATENTS

| | | |
|---|---|---|
| 1,664,716 | Wiberg | Apr. 3, 1928 |
| 2,109,213 | Fearing | Feb. 22, 1938 |
| 2,159,383 | Jones | May 23, 1939 |
| 2,196,888 | Bailey | Apr. 9, 1940 |
| 2,216,219 | Wiley | Oct. 1, 1940 |
| 2,607,971 | Bedford | Aug. 26, 1952 |
| 2,704,867 | Dalziel | Mar. 29, 1955 |
| 2,718,042 | Hokanson | Sept. 20, 1955 |
| 2,823,071 | Malpass | Feb. 11, 1958 |

FOREIGN PATENTS

| | | |
|---|---|---|
| 487,800 | Italy | Dec. 9, 1953 |
| 652,706 | Great Britain | May 2, 1951 |
| 655,268 | Great Britain | July 18, 1951 |